United States Patent
La Roche

[15] 3,653,774
[45] Apr. 4, 1972

[54] IMPROVEMENT OF OBSERVATION-AND-MEASURING THEODOLITE COMBINED WITH A PLURALITY OF STATIONARY EVALUATION DEVICES

[72] Inventor: Ulrich La Roche, Zurich, Switzerland

[73] Assignee: Contraves AG, Zurich, Switzerland

[22] Filed: Apr. 27, 1970

[21] Appl. No.: 32,122

[30] Foreign Application Priority Data

Apr. 30, 1969 Switzerland ..........................6574/69

[52] U.S. Cl. ...............................356/254, 250/203, 356/255
[51] Int. Cl. .....................................G01j 1/20, G02b 27/32
[58] Field of Search.................356/141, 152, 147, 254, 255, 356/145, 203; 250/203

[56] References Cited

UNITED STATES PATENTS 2,995,972   8/1961   Baalson ................................356/145
2,039,878   5/1936   Boykow................................356/254

*Primary Examiner*—James W. Lawrence
*Assistant Examiner*—T. N. Grigsby
*Attorney*—Werner W. Kleeman

[57] ABSTRACT

An observation-and-measuring theodolite for moving objects which is of the type having at least one image evaluation device which can be directed at each section of a spherical segment surrounding the theodolite. There is provided servomotor means for rotating a housing about a stationary substantially vertical axis of rotation, with a first reflector surface being mounted in said housing at an inclination of 45° with respect to said axis of rotation. Further, an attachment housing is rotatably mounted at the aforesaid housing, this attachment housing possessing a light entry or passage window, and a second reflector surface is mounted in the attachment housing behind said light passage window. This second reflector surface is arranged at an inclination of 45° with respect to a horizontal axis passing through the center of said first reflector surface, with said first reflector surface being situated opposite said second reflector surface. Servomotor means serve to rotate the attachment housing about the horizontal axis connecting the centers of both reflector surfaces, and there is also provided at least one stationary evaluation device. The system is arranged such that light from each spherical segment section, towards which there is momentarily directed the light passage window in front of the second reflector surface, is reflected in the direction of the horizontal connection axis of the centers of both reflector surfaces and at said first reflector surface this light is reflected in the direction of its vertical axis of rotation and then is delivered to said at least one stationary evaluation device.

7 Claims, 3 Drawing Figures

IMPROVEMENT OF OBSERVATION-AND-MEASURING THEODOLITE COMBINED WITH A PLURALITY OF STATIONARY EVALUATION DEVICES

BACKGROUND OF THE INVENTION

The present invention relates to a new and improved observation-and-measuring or surveying theodolite for movable objects which is of the type incorporating at least one image evaluation device which can be directed towards each section of a spherical segment surrounding the theodolite.

With known prior art theodolites of this type there is used as the telephoto lens for an evaluation device, for example a television camera, photographic camera and/or an optical sighting device, a telescope which is rotatable about at least one axis of rotation. The telescope, the evaluation device and the support mechanism for these components must be thus moved to allow for continuous directional alignment with the object which is to be continually observed. If, for example, the servomotor movements of these components should follow also quick and nonpredictable movements of the target object without disturbing tracking or directional errors, then, the relevant sluggish masses or mass moment of inertia are disadvantageous with respect to the axes of rotation. Sufficiently rapid tracking movements only then can be realized with the aid of servo drives operating with high performance or efficiency and possessing correspondingly high inherent or dead weight.

Additionally, in order to evaluate the telescopic image of the objective, the evaluation devices presently commercially available on the market are generally not adequate, and must therefore be replaced by specially designed constructions.

SUMMARY OF THE INVENTION

Therefore, a real need exists in the art for an observation-and-measuring theodolite for movable objects which effectively overcomes the aforementioned drawbacks of the prior art constructions. The present invention aims to effectively fulfill this need.

Another, more specific object of the present invention relates to a new and improved observation-and-measuring theodolite for movable objects which is relatively simple in construction, extremely reliable in operation, provides for rapid and precise, errorless tracking of the target object even if it carries out quick and unpredictable movements, and wherein tracking occurs without any substantial errors.

Yet another prime objective of the present invention relates to the provision of an improved theodolite of the aforementioned known type constructed without a telescope and in such a manner that all evaluation devices can be stationarily mounted, so that it is only necessary to adjust, with relatively high accuracy, the direction of the optical object axis, not however the location of the relevant device.

Now, in order to implement these and still further objects of the invention, which will become more readily apparent as the description proceeds, the observation- and measuring theodolite for movable objects, designed according to the teachings of the present invention, is generally manifested by the features that there is mounted at a housing which is servomotor driven to be rotatable about a stationary vertical axis of rotation, a mirror or reflector surface which is inclined through 45° with respect to this axis of rotation, and wherein this mirror or reflector surface is situated opposite a second mirror or reflector surface which is likewise inclined at 45° to a horizontal axis going through the center of the first mirror surface. The second mirror or reflector surface is mounted in an auxiliary or attachment housing rotatable by a servomotor about the horizontal connecting axis taken through both centers of these mirrors or reflectors. The attachment housing is secured or mounted at the aforementioned housing. The entire arrangement is designed such that the light from each section of the spherical segment, towards which there is momentarily directed a light inlet or passage window in front of the second mirror surface, is delivered in the direction of the horizontal connection axis of both mirror centers and this light is reflected at the first mirror surface in the direction of its vertical axis of rotation and delivered to at least one stationarily arranged evaluation device.

Furthermore, there is preferably arranged beneath the stationary vertical axis of rotation of the housing of the first mirror surface an adjustable mirror arrangement in order to selectively deliver the incident light to one of a number of stationary evaluation devices.

In so doing, one of the stationary evaluation devices can be a sighting ocular for an observer with which there is associated a manually adjustable control signal generator, the output signals of which at least are directly delivered to both servomotors thus serving for the continuous directional alignment of the light passage window towards the movable object in accordance with the signals triggered by the observer at the control signal generator. Furthermore, there is advantageously provided an image erecting prism which is mounted between the adjustable mirror arrangement and the sighting ocular and which is continuously rotated as a function of the momentary rotational positions of the attachment housing and the housing rotated about the vertical axis such that the object visible in the sighting ocular is always erect and non-reversed.

It is also possible to design the system such that one of the stationary evaluation devices constitutes a directional transmitter for generating control signals which are at least directly delivered to both servomotors for rotating the rotatable mirror surfaces about their respective horizontal and vertical axes of rotation, and thus insure that after having sighted a movable object the light passage window continuously remains directed towards this target object.

Additionally, one of the stationary evaluation devices can be a television camera, the video signals of which are delivered to an observation- and sighting location remotely located from the theodolite.

BRIEF DESCRIPTION OF THE DRAWINGS

The invention will be better understood and objects other than those set forth above, will become apparent, when consideration is given to the following detailed description thereof. Such description makes reference to the annexed drawings wherein.

DETAILED DESCRIPTION OF THE PREFERRED EMBODIMENTS

Figure 1:
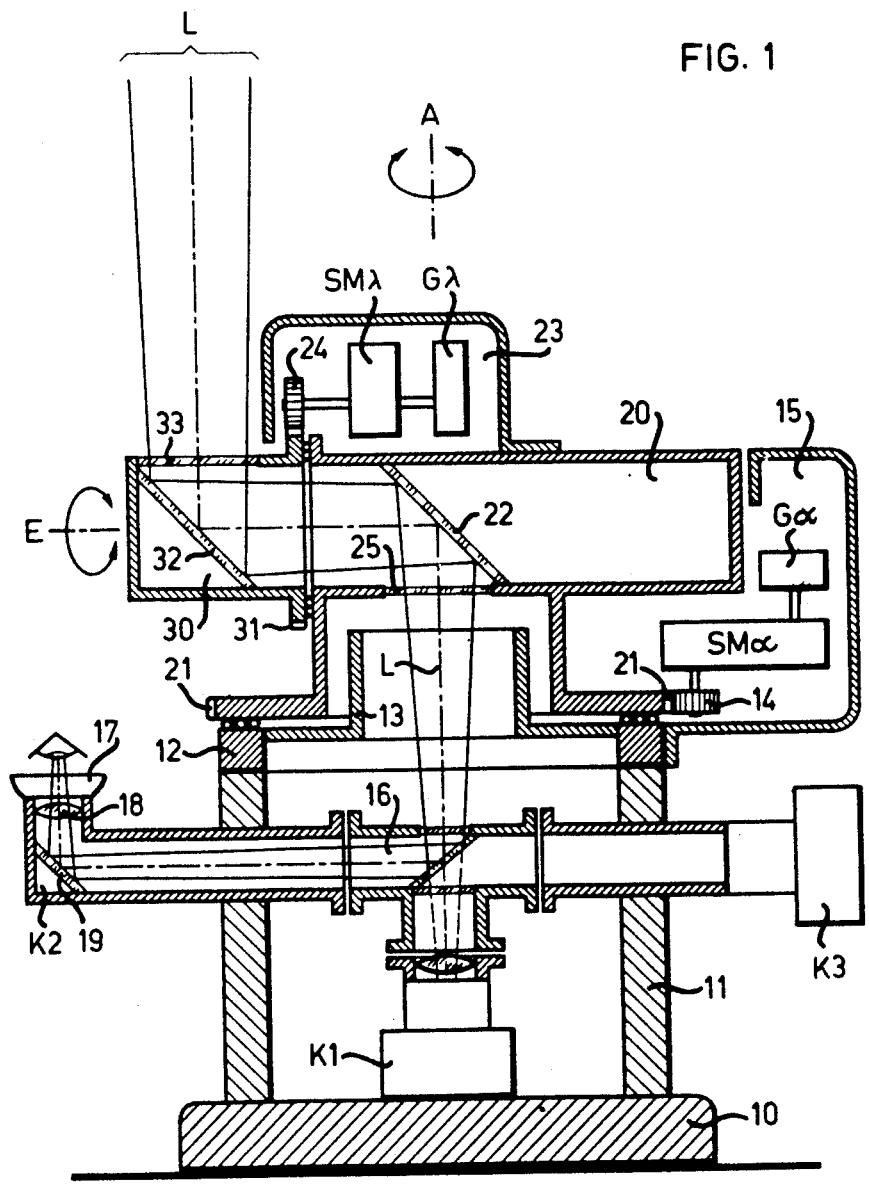
FIG. 1 is a schematic illustration of an embodiment of observation- and-measuring or surveying theodolite for movable objects designed according to the teachings of the present invention and explaining the inventive concepts.

With the benefit of the foregoing discussion in mind, and now particularly referring to the drawings, it will be recognized that in the exemplary embodiment of theodolite depicted in FIG. 1, a hollow column member 11 is mounted upon a base or socket 10. The upper region of this hollow column member 11 has mounted thereat a support or carrier ring member 12 of the movable upper portion of the theodolite and further carries a coaxial, stationary hollow cylinder 13. This stationary hollow cylinder 13 also serves as the support means for conventional non-illustrated sliding contact rings through the agency of which, in known manner, electrical conductors lead to the movable upper portion of the theodolite. Further, a housing 20 is mounted at the stationary support ring member 12 in such a way that this housing as well as all components secured thereto or mounted therein can rotate about the vertical central axis A of the hollow column member 11 and the support ring member 12.

Now, in order to initiate such rotational movements of the upper portion of the theodolite through servomotor drive mechanisms, as will be explained shortly, it will be recognized that a gear ring member 21 or the like is fixed to the housing 20. A power take-off gear 14 of a servomotor SMα meshes with this gear ring member 21. This servomotor SMα is fixedly mounted in a housing portion secured to the support ring member 12. Furthermore, at least one angle measuring transmitter Gα is directly or indirectly driven by the servomotor SMα or the gear ring member 21. This angle measuring transmitter Gα is designed to generate in the form of electrical output signals either continuously the momentary rotational position α of the gear ring or rim member 21 with respect to a predetermined reference position or else to generate countable step-changes of this azimuth angle. This angle measuring transmitter Gα is mounted in the stationary housing portion 15.

Continuing, it will also be recognized that a mirror or reflector 22 is mounted inside of the housing 20 above the hollow cylinder member 13. This mirror or reflector 22 is disposed at an inclination of 45° with respect to the vertical axis of rotation A of the upper portion of the theodolite. At the left side of the housing 20 shown in FIG. 1 there is rotatably mounted an attachment housing 30. Attachment or auxiliary housing 30 is located coaxially with respect to a horizontal axis E extending through the center of the plane of the mirror or reflector 22 and this attachment housing is rotatable about such horizontal axis E. This attachment housing 30 is also fixedly connected with a gear rim or ring member 31 rotatable through the agency of a power takeoff gear 24 of a servometer SMλ arranged in a housing portion 23. Additionally, at least one angle measuring transmitter Gλ is directly or indirectly driven by this gear rim or ring 31. Angle measuring transmitter Gλ has the same function with respect to the continuous determination of the momentary rotational position λ of the attachment housing 30 rotatable about the horizontal axis E as the angle measuring transmitter Gα serving for the continuous determination of the momentary rotational position α of the entire upper portion of the theodolite rotatable about the vertical axis of rotation A.

Now it will be recognized that a second planar or flat mirror or reflector 32 is mounted within the attachment housing 30, this mirror 32 being inclined at an angle of 45° with respect to a horizontal connection axis E taken through the center of both mirrors or reflectors 22, 32. The mirror 32 and a light entry or passage window 33 inserted in front of this mirror or reflector 32 in the wall of the attachment housing 30 can thus be directed towards each section of a spherical segment surrounding the theodolite or towards each location of a spatially freely movable object, through appropriate control of the servomotors SMα and SMλ. The light L emanating from the momentarily observed object is reflected at the mirror 32 in the direction of the horizontal axis of rotation E of the attachment housing 30 to the mirror or reflector 22 and, at this location, is downwardly reflected in the direction of its vertical axis of rotation A through the hollow cylinder member 13. As a result, the light passes through a glass plate 25 arranged beneath the mirror or reflector 22.

No other measures are taken to influence the light A, for instance amplification or reduction of its divergence through lenses or curved mirrors.

Now at the vertical axis of rotation A there is arranged beneath the hollow cylinder member 13 and within the hollow column member 11 an adjustable mirror arrangement 16 at which, depending upon its momentary position and orientation, the light L is selectively or optionally deflected to one of a plurality of evaluation devices K1, K2, K3 which are stationarily arranged in the lower portion of the theodolite, as shown. This mirror arrangement 16, for instance can embody a semi-permeable or semi-transparent mirror, the plane of which is inclined at an angle of 45° to the axis A in order to distribute the incident light, as illustrated in the drawing of FIG. 1, to a photographic camera K1 mounted coaxially with respect to the axis A beneath the mirror arrangement 16 and to an evaluation device K2 constructed as a viewing or sighting apparatus for an observer. However, the mirror arrangement 16 can be additionally also rotatable about the axis A as well as being translatory adjustable in a direction transverse thereto and/or in the direction of such axis A, so that the light can be also delivered, for instance, to the camera K3.

The viewing apparatus K2 is provided for facilitating viewing with an eyepiece cup 17 and an ocular lens 18 inserted therein. Additionally, the viewing apparatus K2 also contains a deflecting mirror 19 so that the observer can look into the ocular or eyepiece from above. If desired, the rotation of the image out of its natural image position brought about by the cooperation of the mirrors or reflectors 22, 32 during their rotation can be compensated through appropriate rotation of a Schmitt rotary prism 4 of the type shown in FIG. 3 and mounted in the viewing apparatus K2, as best shown by referring to FIG. 2. The photographic camera K1 can, for instance, as is known for other photo theodolites, serve to photograph at regular time intervals an object continuously tracked by the theodolite, for instance an aircraft, whereby there can be applied to the photograph also a reference crosshair and in coated format also the exposure time $t$ as well as the associated values $α_t$ and $λ_t$ of the asymith angle non-illustrated the elevation angle of the momentary direction of sight of the light passage window 33.

Furthermore, the camera K3 or a different non-illustrated camera can also be constructed as a so-called high speed camera for producing an especially large number of photographs of the object per unit of time.

However, there could also be provided a stationary television camera for evaluating the light L reflected thereto. The video signals of the television camera can then be transmitted to a remotely located observation station.

Furthermore, there could also be employed as the evaluation device an automatically operating optical sighting or directional device, for instance an automatic infrared-tracking and sighting apparatus using laser radiation for generating control signals for the servomotors SMα and SMλ as a function of the momentary deviations of the direction of sight of the theodolite from the momentary sighting devices to a movable object. In so doing, it would be possible in known manner to also have the theodolite shown in FIG. 1 continuously and automatically track a movable object once it has been sighted. In fact, all of the measures and auxiliary equipment which is used with the known types of observation-and-measuring or surveying theodolites for movable objects can also be employed with the herein illustrated and described novel theodolite of the present invention.

However, an essential difference resides in the fact that due to the absence of a telescope which moves along therewith, the objective of all evaluation devices can be the same as if it is directly directed at an object at a corresponding or appropriate distance. Additionally, there is thus rendered possible considerable saving in support masses which have to be moved by servomotor drives, so that it is possible to also track objects without disturbing tracking errors with the aid of servomotors of lower output or performance, that is to say, the desired high servo band region can be realized. Furthermore, only the orientation of the optical axis of the employed evaluation device must be exactly adjusted, not however its positions, because the light which is received retains the natural afocal path of the light rays until entering the objective of the evaluation device. Naturally, the servomotors SMα and SMλ as well as the transmission or gearing devices acting directly upon the rotatable components of the theodolite can be extensively freely chosen. Thus, for instance, it is possible to provide hydraulic or pneumatic servo drives. Further, the momentary rotational positional values or the changes thereof are advantageously determined by a respective pair of diametrically situated angle measuring devices, in order to compensate in known manner errors in eccentricity of the rotating components with respect to their axes of rotation A and E.

Figure 2:
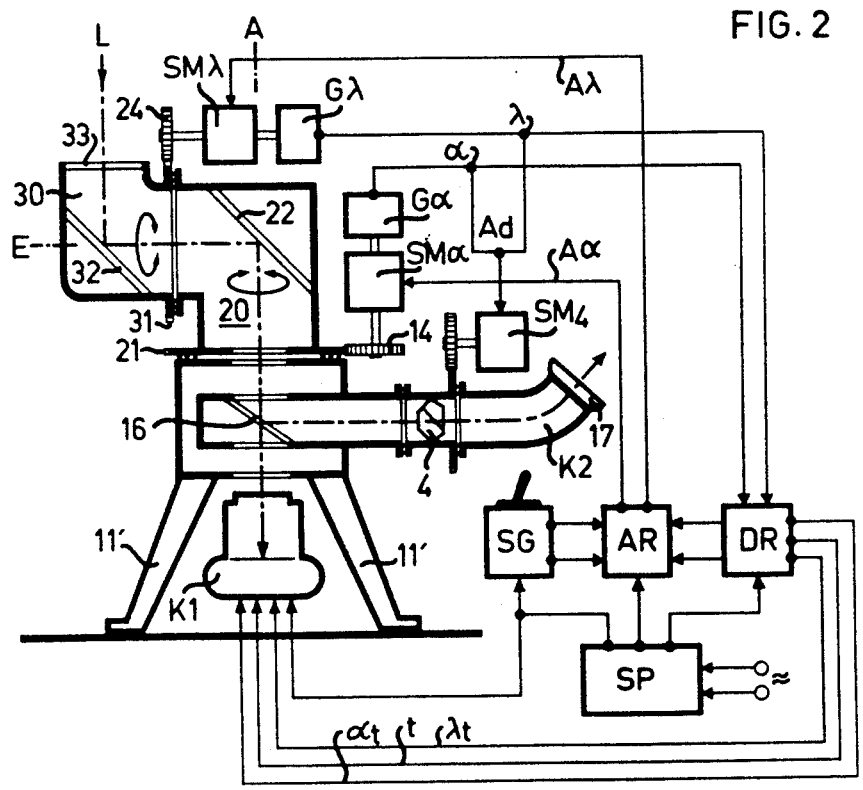
FIG. 2 is a simplified constructional representation of inventive apparatus having mounted thereat servomotors and angle measuring transmitters.

Considering now the theodolite construction which has been shown in a simplified version in FIG. 2, it should be understood that corresponding components have been designated with the same reference characters or numerals as used with the arrangement of FIG. 1. The difference between this embodiment and that shown in FIG. 1 resides primarily in the construction of the lower portion of the theodolite which is here constructed as a three-legged tripod or support 11'. Mounted at the viewing apparatus K2 is a Schmitt rotary prism 4. This prism 4 is rotated by a suitable servomotor SM₄ as a function of the sum $\alpha + \lambda$ of the angle measuring transmitter-outputs generated at a suitable adding mechanism Ad in order to compensate for undesired rotation of the image at the eyepiece or ocular 17. A control device SG which can be manually moved in two directions $\alpha$ and $\lambda$ is provided for the observer, and the output signals of this control device SG are delivered to a computer AR for generating the signals A$\alpha$ and A$\lambda$ for the servomotors SM$\alpha$ and SM$\lambda$.

Furthermore, auxiliary signals from a data computer DR are also delivered to this computer AR, and to which data computer DR there are also transmitted the output signals of the angle measuring transmitters G$\alpha$ and G$\lambda$. The momentary signals produced by the data computer DR for a time value $t$ and corresponding discrete angle values $\alpha_t$, $\lambda_t$ are delivered to the camera K$_t$ for application to the photographs.

Figure 3:
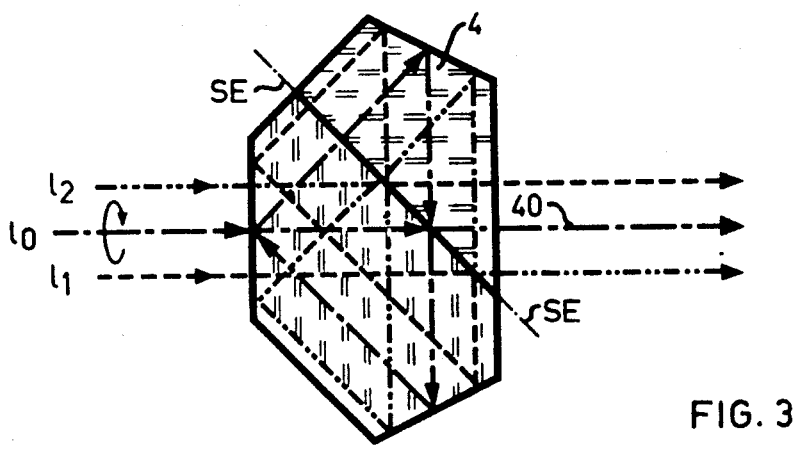
FIG. 3 is an enlarged view of a Schmitt rotary prism employed in the arrangement of FIG. 2.

Finally, it is here mentioned that reference character SP designates a voltage supply generator for the auxiliary equipment SG, AR and DR as well as for the camera K1, this voltage supply generator being connected to a current source $\approx$. By way of completeness, it is here mentioned that the Schmitt rotary prism 4 which is rotatable about the axis 40 is known to the art. In FIG. 3 there have been indicated the possible path of rays $l_0$, $l_1$, $l_2$. The inclined mirror plane SE is coated so as to be semi-permeable.

While there is shown and described present preferred embodiments of the invention, it is to be distinctly understood that the invention is not limited thereto but may be otherwise variously embodied and practiced within the scope of the following claims.

What is claimed is:

1. An observation-and-measuring theodolite for moving objects which is of the type having at least one image evaluation device which can be directed at each section of a spherical segment surrounding the theodolite, comprising a rotatable housing, a first reflector surface mounted in said housing at an inclination of approximately 45° with respect to said axis of rotation, an attachment housing rotatably mounted at said housing, said attachment housing possessing a light passage window, a second reflector surface mounted in said attachment housing behind said light passage window, said second reflector surface being arranged at an inclination of approximately 45° with respect to a horizontal axis passing through the center of said first reflector surface, said first reflector surface being situated opposite said second reflector surface, the improvement comprising servomotor means for rotating said rotatable housing about a stationary substantially vertical axis of rotation, servomotor means for rotating said attachment housing about the horizontal axis connecting the centers of both reflector surfaces, both said rotatable housing rotatable about said vertical axis of rotation and said attachment housing rotatable about said horizontal axis of rotation being devoid of telescope means having a refracting power greater than zero, a stationary housing, a plurality of stationary evaluation devices provided for said stationary housing, wherein light from each spherical segment section, towards which there is momentarily directed the light passage window in front of said second reflector surface, is reflected in the direction of said horizontal connection axis of the centers of both reflector surfaces and at said first reflector surface is reflected in the direction of its vertical axis of rotation and then is delivered to at least one of said stationary evaluation devices, an adjustable mirror arrangement mounted in said stationary housing at the stationary vertical axis of rotation below said first reflector surface in order to optionally deliver the incident light to one of said plurality of stationary evaluation devices.

2. The theodolite defined in claim 1, wherein one of said plurality of evaluation devices comprises a television camera, the video signals of which are capable of being delivered to an observation-and-sighting location remote from the theodolite.

3. The theodolite defined in claim 1, wherein one of said plurality of stationary evaluation devices defines a sighting ocular for an observer, manually-adjustable control signal generator means connected with said sighting ocular, the output signals of said control signal generator means being directly delivered to both of said servomotor means which thus continuously direct said light passage window towards a movable object in accordance with the signals triggered at said control signal generator means by the observer.

4. The theodolite defined in claim 3, further including an image erecting prism mounted between said adjustable mirror arrangement and said sighting ocular, and means for continuously rotating said image erecting prism as a function of the momentary rotational positions of said attachment housing and said housing rotatable about said vertical axis so that the object visible in said sighting ocular always appears erect and non-reversed.

5. The theodolite defined in claim 1, wherein a respective gearing member is provided for said housing and said attachment housing, said servomotor means of said housing drivingly acting upon the associated gearing member for rotating said housing about said vertical axis of rotation, and said servometer means of said attachment housing drivingly acting upon the associated gearing member for rotating said attachment housing about said horizontal axis.

6. The theodolite defined in claim 5, further including at least one respective angle measuring transmitter driven by each associated gearing member for generating electrical angle measurement signals.

7. The theodolite defined in claim 6, further including a stationary theodolite housing portion, wherein said servometer means for rotating said attachment housing about said horizontal axis of rotation as well as the associated angle measuring transmitter are mounted at said housing rotatable about said vertical axis of rotation, and wherein said servometer means serving to rotate said housing about said stationary vertical axis of rotation and its associated angle measuring transmitter are mounted in said stationary theodolite housing portion.

* * * * *